US006558259B1

(12) United States Patent
Maruyama et al.

(10) Patent No.: US 6,558,259 B1
(45) Date of Patent: May 6, 2003

(54) GAME MACHINE WITH EXTENDIBLE PLAY CRITERIA AND INFORMATION STORAGE MEDIUM

(75) Inventors: Kazuya Maruyama, Tokyo (JP); Isao Nakamura, Tokyo (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/499,639

(22) Filed: Feb. 8, 2000

(30) Foreign Application Priority Data

Feb. 12, 1999 (JP) ............................................ 11-033675

(51) Int. Cl.⁷ .............................. A63F 9/14; A63B 67/00
(52) U.S. Cl. .......................................... 463/59; 273/445
(58) Field of Search ...................... 463/1–9, 14, 16–23, 463/25, 43–44, 58–59, 30–32, 37–38, 49, 60; 473/27; 273/440–442, 440.1, 445–446, 460–461; 327/392–393

(56) References Cited

U.S. PATENT DOCUMENTS

| | | | | |
|---|---|---|---|---|
| 4,907,803 A | * | 3/1990 | Van Anda | 473/496 |
| 5,711,708 A | * | 1/1998 | Fischer | 463/36 |
| 6,142,870 A | * | 11/2000 | Wada et al. | 463/4 |

FOREIGN PATENT DOCUMENTS

GB          2-170 937 A          8/1986

OTHER PUBLICATIONS http://www.yesterdayland.com/popedia/shows/arcade/ag1149.php.
http://www.yesterdayland.com/popedia/shows/arcade/ag1126.php.

* cited by examiner

*Primary Examiner*—Kim Nguyen
(74) *Attorney, Agent, or Firm*—Oliff & Berridge, PLC (57) ABSTRACT

A game machine and information storage medium which can change at least one of game termination numbers specified for items including a lap number, life, time limit, player's vehicles, game points and game stages, for player's benefit, in comparison with the normal game termination number to be set by reception of a game charge for a normal one play of the game. This game machine comprises: an additional charge processing section for receiving an additional charge before game termination; a game termination number setting section for setting the game termination number for player's benefit in comparison with the normal game termination number set by reception of a game charge for a normal one play of the game; and a game termination processing section for processing for terminating the game when a specific number of laps or a time limit reaches the changed game termination number.

6 Claims, 6 Drawing Sheets

ONE MORE COIN WILL INCREASE
YOUR SPECIFIC NUMBER OF LAPS!

<u>A</u>　　　2LAPS　→　　3LAPS
　　　TIME LIMIT 4'30"00　　TIME LIMIT 6'45"00

<u>B</u>　　　2LAPS　→　　3LAPS
　　　TIME LIMIT 3'00"00　　TIME LIMIT 4'30"00

<u>C</u>　　　2LAPS　→　　3LAPS
　　　TIME LIMIT 3'40"00　　TIME LIMIT 5'30"00

CAUTION! INCREASING YOUR SPECIFIC NUMBER OF LAPS WILL SHIFT GAME MODE TO A TIME ATTACK MODE (THERE IS NO OTHER PLAYER).

INPUT YOUR DECISION WITH BRAKE LEVER

GAME MACHINE WITH EXTENDIBLE PLAY CRITERIA AND INFORMATION STORAGE MEDIUM

BACKGROUND OF THE INVENTION

1. Field of the Invention

The present invention relates to a game machine and information storage medium.

2. Description of the Prior Art

There is generally known a popular racing game in which a player gets on and controls a mimic mover imitating a racing car or motorcycle to run along a predetermined course.

In such a racing game machine, efforts have been made to provide a more realistically formed mover housing, to make the controllability more complex and difficult and to set a more difficult course, such that the player can more excitingly enjoy the game with an increased reality. However, such a complex, difficult game machine requires the improved skill in the player. Thus, a player may appear who wants to familiarize the operational feel more rapidly by more running a rounding course and longer playing the game.

However, the racing game of the prior art had been preset to limit one play with respect to the maximum number of laps and the acceptable time period. If a given number of laps are attained or the time limit is elapsed, the game will be terminated. If the player wants to play the game more or longer, he or she must re-start the game. In the re-started game, the player will play the game from its initial state.

There is also known a game machine that can be played by a player in a continue manner. In such a continue type game machine, the player can replay the game subsequently from the time point at which the game has been terminated, if another coin is thrown into the machine after the previous termination of game. Even in such a case, however, the player will be put a chill on the game since it has been interrupted.

Speaking again, the prior art game must forcedly be interrupted if the player wants to enjoy the game more or longer. This greatly reduces the pleasure of the game to put the player off the game.

SUMMARY OF THE INVENTION

In view of the aforementioned problems in the prior art, it is an objective of the present invention to provide a game machine and information storage medium which can change at least one of game termination numbers specified for items including a lap number, life, time limit, player's vehicles, game points and game stages, for player's benefit, in comparison with the normal game termination number to be set by reception of a game charge for a normal one play of the game.

(1) According to a first aspect of the present invention, there is provided a game machine for a game which is terminated when at least one of given items including a lap number, life, a play time, player's vehicles, game points and game stages, reaches a given game termination number specified for each item, the game machine comprising: means for receiving an additional game charge before game termination; means for changing the game termination number for the player's benefit, in response to reception of an additional game charge before game termination, in comparison with the normal game termination number to be set by reception of a game charge for a normal one play of the game; and means for processing for terminating the game when at least one of the items reaches the changed game termination number.

According to a second aspect of the present invention, there is provided an information storage medium comprising information for implementing above-described means.

In a game which is terminated when a play time reaches a given time limit, for example, this time limit is the game termination number. In a game which is terminated when the number of cleared game stages reaches a given number, this number is the game termination number.

According to the above description, reception of an additional game charge by the player can change the game termination number for player's benefit in comparison with that in the normal one play of the game. The additional game charge could be inserted before starting the game or during the game.

The additional charge may be received in any form of coin, bill or card, or imitation money.

Then, the game is terminated when any of the items reaches the changed game termination number.

In this way, the player can play the game with increased number of laps, life, time limit, player's vehicles, game points or game stages in comparison with those in the normal one-play of the game, for example, without interruption of the game as in the replay game or Continue-game.

Therefore, the player can concentrate his or her attention on the game for desired time. Moreover, the player's skill in operation can be improved by continuously playing the game.

(2) According to a third aspect of the present invention, there is provided a game machine for a game which is terminated when at least one of given items including a lap number, life, a play time, player's vehicles, game points and game stages, reaches a given game termination number specified for each time, the game machine comprising: means for receiving different amount of charges as a game charge for starting the game; means for setting the game termination number in accordance with the amount of received charges; and means for processing for terminating the game when at least one of the items reaches the game termination number set in accordance with the amount of received charges.

According to a fourth aspect of the present invention, there is provided an information storage medium comprising information for implementing said means.

In a game which is terminated when a play time reaches a given time limit, for example, this time limit is the game termination number. In a game which is terminated when the number of cleared game stages reaches a given number, this number is the game termination number.

According to the above description, different amount of charges can be received as a game charge and the game termination number is set in accordance with the amount of received charges. Therefore, by inserting a game charge for desired game conditions, the player can set the game termination number desirably.

The game charge may be received in any form of coin, bill or card, or imitation money.

Then, the game is terminated when any of the items reaches the game termination number set according to the amount of received charges.

In this way, the player can play the game until any of items including a lap number, life, a play time, player's vehicles, game points or game stages reaches the game termination number set in accordance with the amount of received charges, for example, without interruption of the game as in the replay game or continuous game.

Therefore, the player can concentrate his or her attention on the game for desired time. Moreover, the player's skill in operation can be improved by continuously playing the game.

(3) According to a fifth aspect of the present invention, there is provided a game machine for a game which is terminated when a play time reaches a given time limit, the game machine comprising: means for receiving an additional game charge before game termination; means for changing the time limit for the player's benefit, in response to reception of an additional game charge before game termination, in comparison with the normal time limit to be set by reception of a game charge for a normal one play of the game; and means for processing for terminating the game when the play time reaches the changed time limit.

According to a sixth aspect of the present invention, there is provided an information storage medium comprising information for implementing said means.

In this way, reception of an additional game charge by the player can change the time limit for player's benefit in comparison with the normal time limit for a normal one play of the game. The additional game charge may be inserted before starting the game or during the game.

The additional charge may be received in any form of coin, bill, or card, or imitation money.

Then, the game is terminated when the play time reaches the changed time limit.

In this way, the player can play the game for the time limit longer than the normal time limit for one game play, without interruption of the game as in the replay game or continuous game.

Therefore, the player can concentrate his or her attention on the game for desired time. Moreover, the player's skill in operation can be improved by continuously playing the game.

(4) According to a seventh aspect of the present invention, there is provided a game machine for a game which is terminated when a play time reaches a given time limit, the game machine comprising: means for receiving different amount of charges as a game charge for starting the game; means for setting the time limit in accordance with the amount of received charges; and means for processing for terminating the game when the play time reaches the time limit set in accordance with the amount of received charges.

According to an eighth aspect of the present invention, there is provided an information storage medium comprising information for implementing said means.

In this way, different amount of charges can be received as a game charge and the time limit is set in accordance with the amount of received charges. Therefore, by inserting a game charge for desired time limit, the player can set the time limit desirably.

The game charge may be received in any form of coin, bill or card, or imitation money.

Then, the game is terminated when the play time reaches the time limit set according to the amount of received charges.

In this way, the player can play the game for the time limit set in accordance with the amount of received charges, without interruption of the game as in the replay game or continuous game.

Therefore, the player can concentrate his or her attention on the game for the time limit set according to the amount of received charges, without being troubled by interruption. Moreover, the player's skill in operation can be improved by continuously playing the game for desired time.

(5) According to a ninth aspect of the present invention, there is provided a game machine for a game which is terminated when a moving body operated by a player has moved a specific number of laps on a game course, the game machine comprising: means for receiving an additional game charge before game termination; means for changing the specific number of laps for the player's benefit, in response to reception of an additional game charge before game termination, in comparison with the normal specific number of laps to be set by reception of a game charge for a normal one play of the game; and means for processing for terminating the game when the moving body operated by the player has moved the changed specific number of laps on the game course.

According to a tenth aspect of the present invention, there is provided an information storage medium comprising information for implementing said means.

In this case, a specific number of laps is used as the game termination number. The game is terminated when the moving body has moved the changed number of laps on the game course.

In this way, reception of an additional game charge by the player can change the specific number of laps for player's benefit in comparison with the normal specific number of laps for a normal one play of the game. The additional game charge may be inserted before starting the game or during the game.

The additional charge may be received in any form of coin, bill, or card, or imitation money.

Then, the game is terminated when the moving body operated by the player has moved the changed number of laps on the game course.

In this way, the player can play the game with a larger number of laps than the specific number of laps for the normal one game play, without interruption of the game as in the replay game or continuous game.

Therefore, the player can concentrate his or her attention on the game with a larger number of laps, without being troubled by interruption. Moreover, the player's skill in operation can be improved by moving the moving body a larger number of laps.

(6) According to an eleventh aspect of the present invention, there is provided a game machine for a game which is terminated when a moving body operated by a player has moved a specific number of laps on a game course, the game machine comprising: means for receiving different amount of charges as a game charge for starting the game; means for setting the specific number of laps in accordance with the amount of received charges; and means for processing for terminating the game when the moving body operated by the player has moved on the game course the specific number of laps set in accordance with the amount of received charges.

According to a twelfth aspect of the present invention, there is provided an information storage medium comprising information for implementing said means.

In this case, a specific number of laps is used as the game termination number. The game is terminated when the moving body has moved the changed number of laps on the game course.

In this way, different amount of charges can be received as a game charge and the specific number of laps is set in accordance with the amount of received charges. Therefore, by inserting a game charge for desired specific number of laps, the player can set the specific number of laps desirably.

The game charge may be received in any form of coin, bill or card, or imitation money.

Then, the game is terminated when the moving body operated by the player has moved the specific number of laps set in accordance with the amount of received charges.

In this way, the player can play the game with a specific number of laps set in accordance with the amount of received charges, without interruption of the game as in the replay game or continuous game.

Therefore, the player can concentrate his or her attention on the game with a specific number of laps set according to the amount of received charges, without being troubled by interruption. Moreover, the player's skill in operation can be improved by moving the moving body a larger number of laps.

DETAILED DESCRIPTION OF THE PREFERRED EMBODIMENTS

A preferred embodiment of the present invention will now be described in detail with reference to the drawings. Although this embodiment is described as to a motorcycle racing game, the present invention can be similarly applied to any of various other games.

Figure 1:
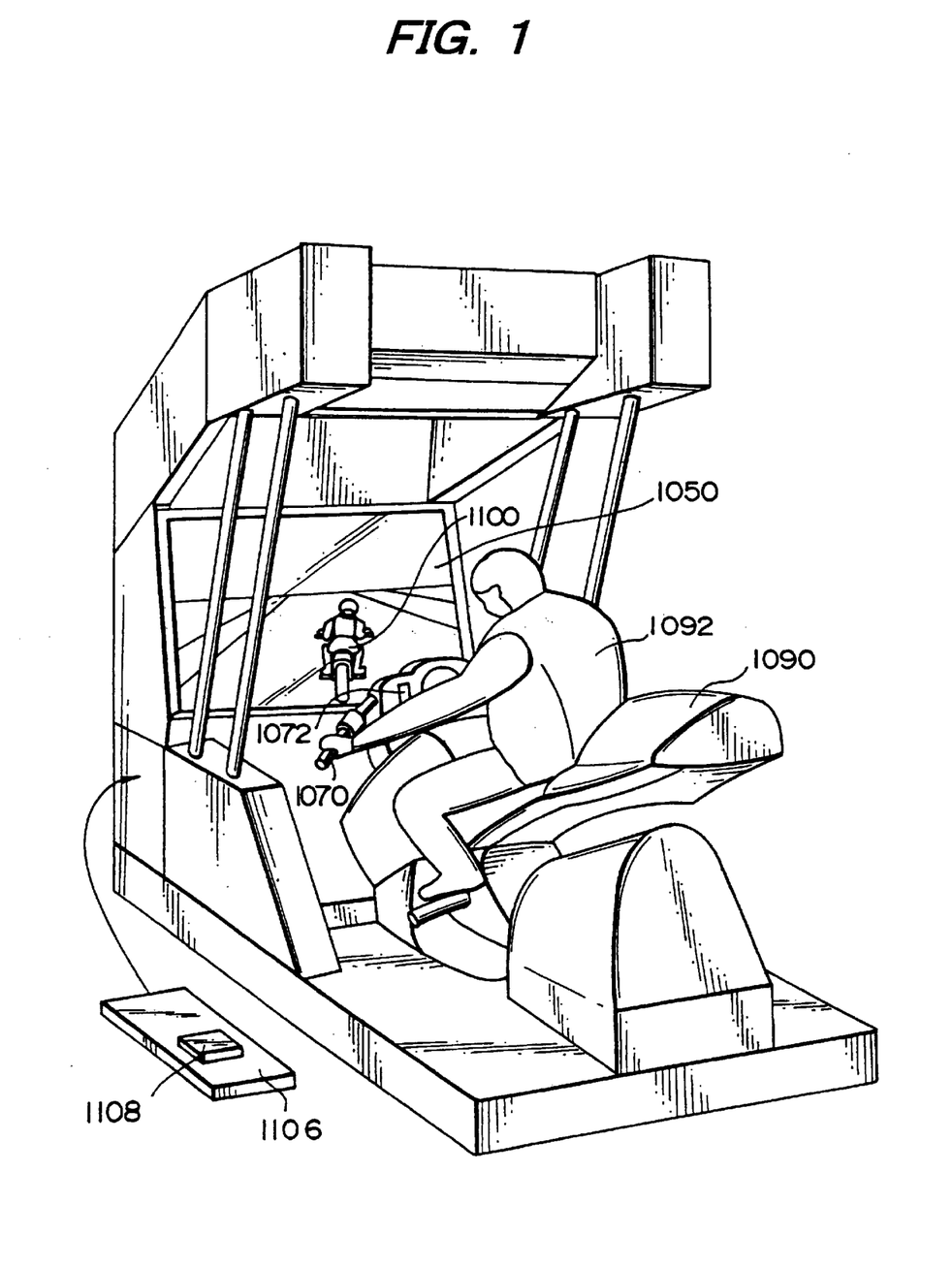
FIG. 1 is a schematic and perspective view showing the appearance of a game machine according to an embodiment of the present invention.

FIG. 1 schematically shows the appearance of a game machine according to this embodiment.

The game machine comprises a motorcycle body 1090 imitating an actual racing motorcycle and a display 1050 disposed in front of the motorcycle body 1090.

A player 1092 can manipulate a handgrip 1070, throttle and brake lever and roll the motorcycle body 1090 while watching the game screen on the display 1050. By operating the throttle or brake lever, the player 1092 can accelerate or decelerate the moving body (motorcycle) 1100 displayed on the display 1050. When the player 1092 operates the handgrip 1070 or rolls the motorcycle body 1090, the moving body 1100 turns and rolls.

The motorcycle body 1090 can be tilted laterally. By moving the center of gravity laterally to tilt the motorcycle body 1090, the player 1092 can also control the motorcycle within a game space.

When the motorcycle body 1090 is tilted leftward or rightward, it receives a restoring force in accordance with the speed of the motorcycle within the game space, as a reaction force toward the neutral position of the motorcycle body 1090. Thus, the player can obtain the same operational feeling and difficulty as in riding the actual racing motorcycle.

Figure 2:
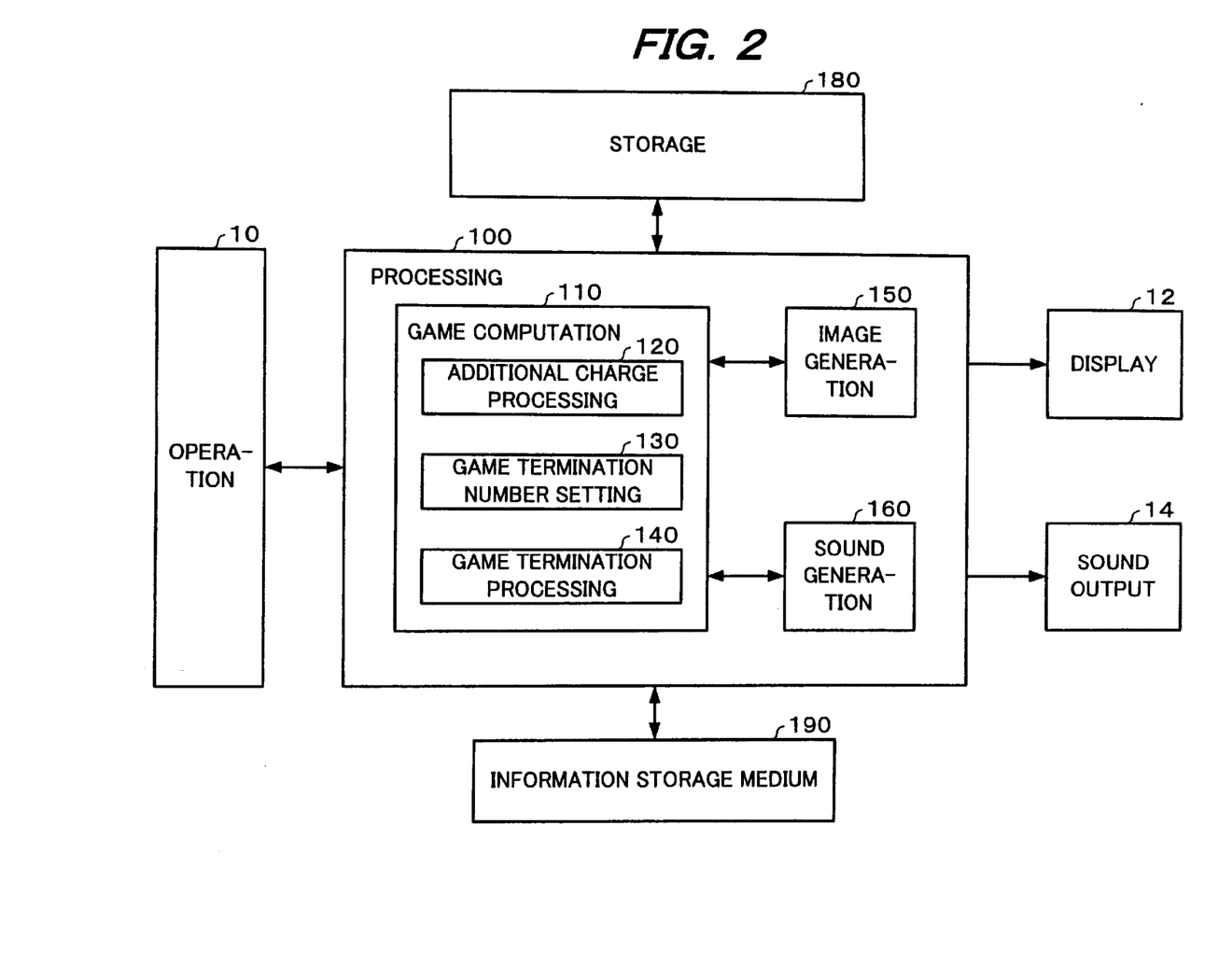
FIG. 2 is a functional block diagram of the game machine according to this embodiment of the invention.

FIG. 2 shows a functional block diagram illustrating the game machine of this embodiment.

An operation section 10 is used to input operational information, and the function thereof can be implemented by hardware such as the handgrip 1070, throttle, brake lever, and motorcycle body 1090 shown in FIG. 1, for example.

A processing section 100 performs processing for controlling the entire system, sending instructions to the blocks in the system, executing computation for the game and so on. The function thereof can be implemented by hardware such as CPU (CISC or RISC), DSP or ASIC (such as gate array), or by a given program (game program).

A storage section 180 functions as a work area for the processing section 100, and the function thereof can be implemented by hardware such as RAM.

A computer-readable information storage medium 190 stores program or data. The function of this information storage medium 190 can be implemented by hardware such as an optical disk (CD-ROM or DVD), a magneto-optical disk (MO), a magnetic disk, a hard disk, a magnetic tape, a portable information storage device (memory card, PDA, portable game machine or game cassette), or a semiconductor memory. The processing section 100 performs processing based on the program and data stored in the information storage medium 190.

A part or all of the information stored in the information storage medium 190 is transferred to the storage section 180 when the system is powered on.

The processing section 100 comprises a game computation section 110, an image generation section 150 and a sound generation section 160.

According to the operational information from the operation section 10 and the game program, the game computation section 110 performs processing, such as receiving coins (or game charge), setting game mode, progressing the game, setting the selection screen, determining the position of the moving body (motorcycle, character, robot, motorcar, tank, aircraft, space ship, watercraft, boat, ski, surfboard, ball, bullet or the like), determining the viewpoint or view direction, reproducing motion of the moving body, arranging objects in an object space, hit-checking, computing game results (or records), enabling a plurality of players to play within a common game space, or terminating the game. In this embodiment, the game is terminated when a lap number reaches a specified number.

The image generation section 150 generates game images according to the game computation by the game computation section 110. The game images generated by the image generation section 150 are displayed on a display section 12.

The sound generation section 160 generates a game sound according to the game computation of by game computation section 110. The game sound generated by the sound generation section 160 is outputted through a sound output section 14.

The game computation section 110 comprises an additional charge processing section 120, a game termination number setting section 130 and a game termination processing section 140.

In this embodiment, the additional charge processing section 120 receives an additional game charge which enables the game with a specific number of laps larger than the specific number of laps for the normal one game-play.

In this case, a specific number of laps is the goal of the game, that is the mark for game termination. The game is terminated when a lap number reaches the specific number of laps. In this embodiment, the time limit is set in accordance with the specific number of laps. For example, the time limit can be defined as the standard running time for the specific number of laps. Thus, the game is terminated when the play time exceeds the time limit even if a lap number is under the specific number of laps. In this embodiment, a specific number such as the time limit or the specific number of laps used for determining game termination is called a game termination number.

If the additional game charge is inserted, the game termination number setting section 130 changes the specific number of laps for player's benefit in comparison with the normal one set by reception of a game charge for the normal one play of the game. The game termination number setting section 130 also changes the time limit according to the change of the specific number of laps for player's benefit in comparison with the normal time limit set by reception of a game charge for the normal one play of the game.

The game termination processing section 140 terminates the game when a lap number or play time reaches the specific number of laps or time limit changed for player's benefit.

The setting of the specific number of laps when an additional game charge is inserted (that is a feature of this embodiment) will be described below.

Figure 3:
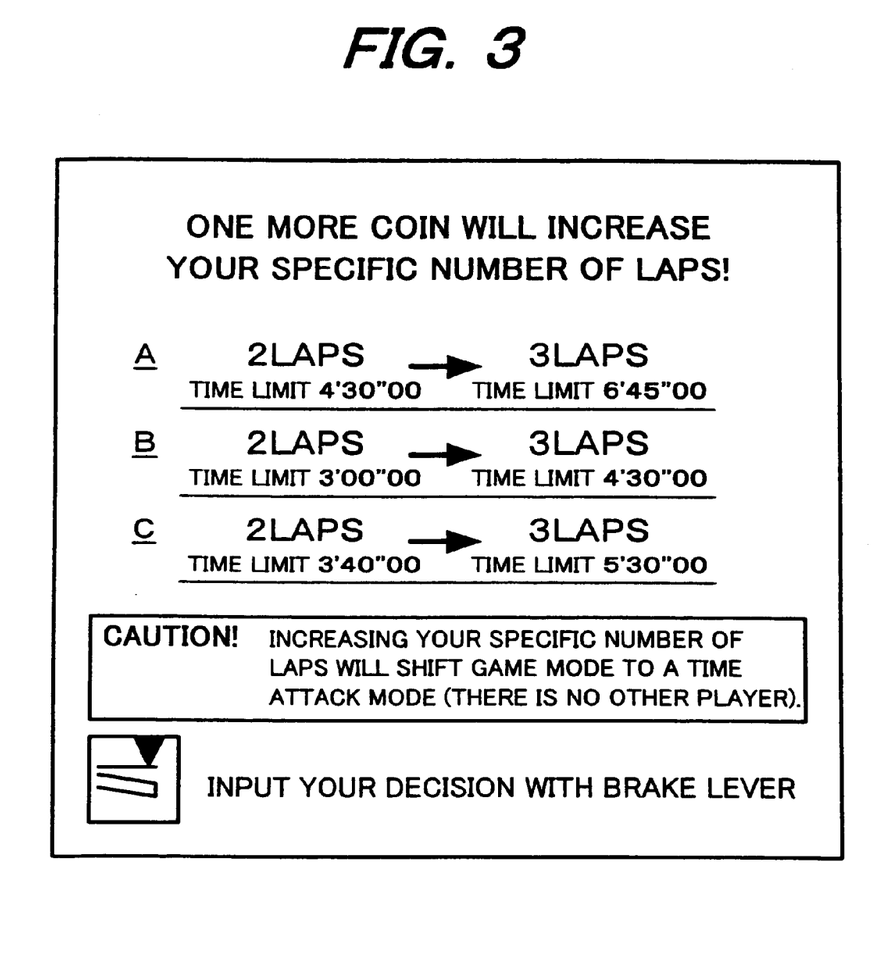
FIG. 3 shows a game screen for receiving an additional game charge in this embodiment.
Figure 4:
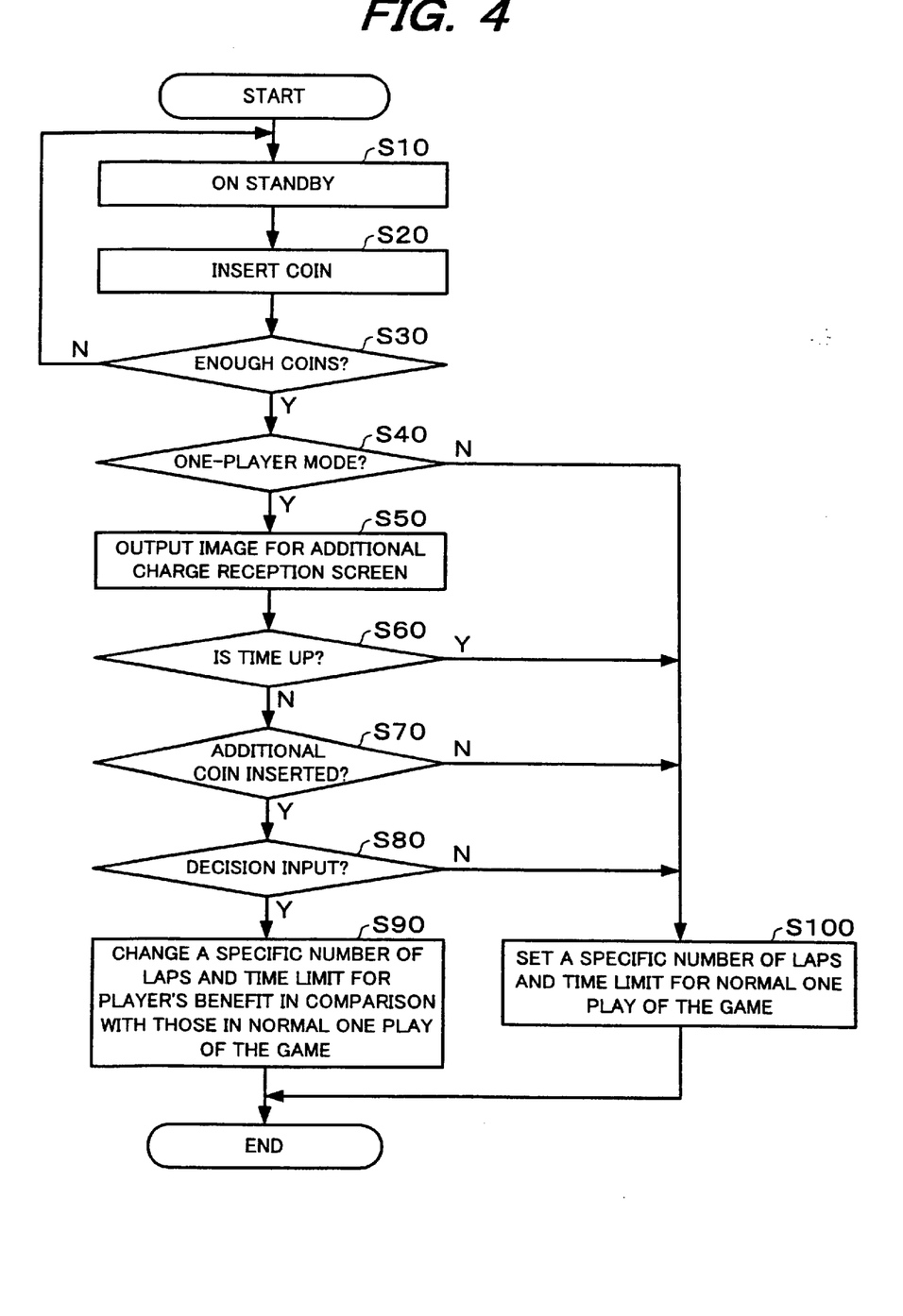
FIG. 4 shows a flow chart illustrating an example of operation for setting a game termination number on reception of an additional game charge in this embodiment of the invention.

FIG. 3 is a view showing a game screen for receiving an additional game charge in this embodiment while FIG. 4 is a flow chart illustrating an example of operation for setting the game termination number on reception of the additional game charge.

When a coin is inserted to the game machine in its standby state, it is determined whether the received game charge is equal to or more than the normal one-play charge. If it is determined that the received game charge is not equal to or more than the normal one-play charge, the game machine is again placed in its standby state (steps S10, S20 and S30). In this embodiment, the game charge is represented by the coins.

If it is determined that the game charge is equal to or more than the normal one-play charge, it is further determined whether a command to specify a one-play mode is inputted on insertion of the coin. In this embodiment, the command to specify a one-player mode is inputted by actuating the brake lever on insertion of the coin. Only when the command to specify a one-player mode is inputted, the specific number of laps or the time limit can be changed for player's benefit in comparison with the normal one to be set by reception of the game charge for a normal one game play, by inserting the additional game charge.

When the command to specify a one-player mode is inputted, an additional charge reception screen as shown in FIG. 3 is outputted (Step 50). In the normal one play of the game in this embodiment, for example, the specific number of laps is 2 laps, independent of which course has been selected by the player from among the courses A, B and C. The time limit for each course is defined in accordance with the selected course.

However, if the player inserts an additional game charge within a given time during which the additional charge reception screen is displayed, as shown in FIG. 3, and input the decision to increase the specific number of laps by actuating the brake, the specific number of laps becomes 3 laps for each course. Thus, the specific number of laps or time limit as the game termination number is changed for player's benefit in comparison with the normal one to be set by reception of a game charge for the normal one-play of the game (steps S60, S70, S80 and S90).

If no additional charge is inserted within a given time or if no decision is input by actuating the brake, the specific number of laps or time limit as the game termination number is set to the normal one for the normal one-play of the game (steps S60, S70, S80 and S100).

Figure 5:
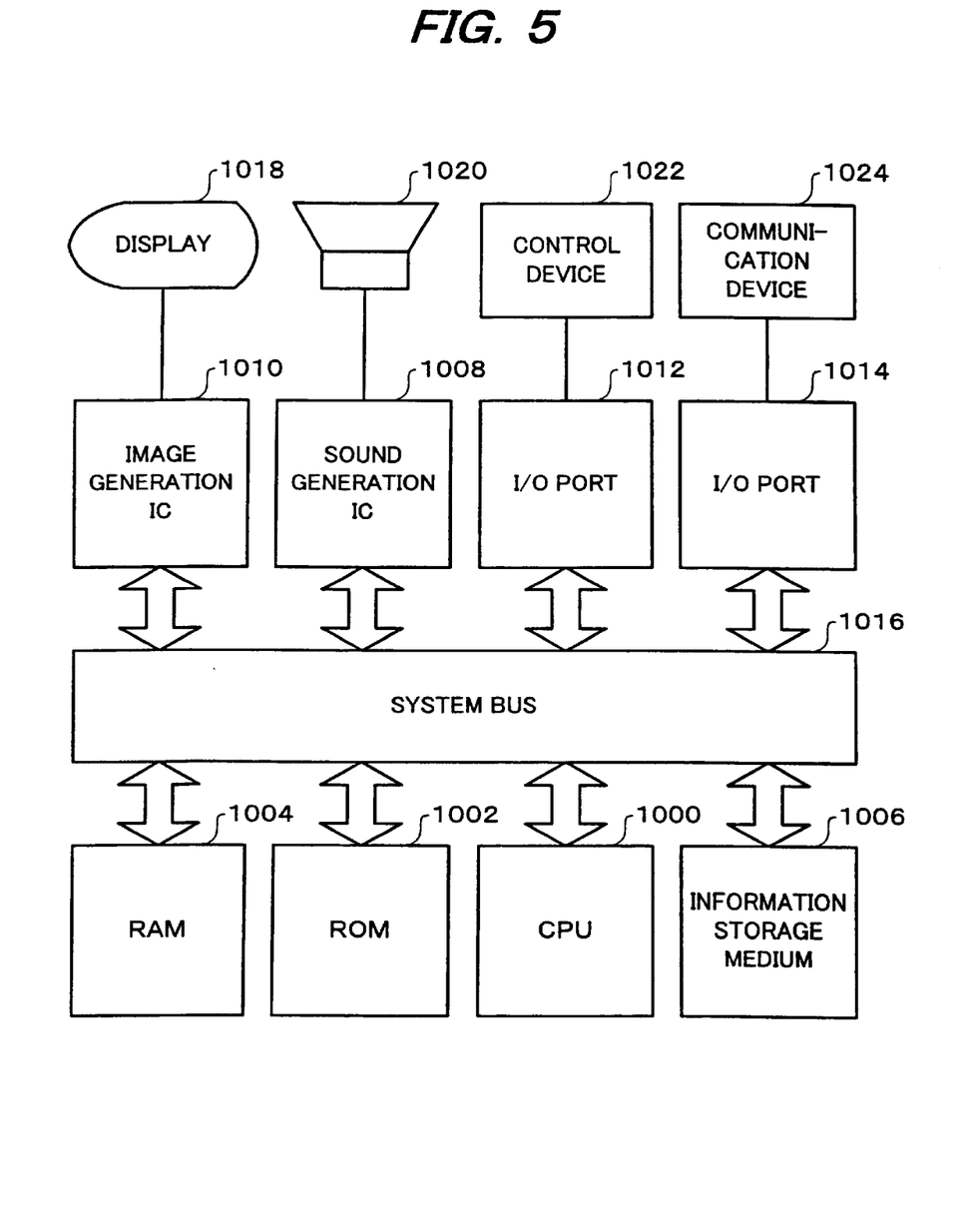
FIG. 5 shows an example of hardware configuration for implementing this embodiment of the invention.

An example of hardware configuration for implementing this embodiment will be described with reference to FIG. 5. The game machine shown in FIG. 5 comprises CPU 1000, ROM 1002, RAM 1004, an information storage medium 1006, a sound generation IC 1008, an image generation IC 1010 and I/O ports 1012, 1014, all of which are interconnected through a system bus 1016 for data reception and transmission. The image generation IC 1010 is connected to a display 1018; the sound generation IC 1008 to a speaker 1020; the I/O port 1012 to a control device 1022; and the I/O port 1014 to a communication device 1024.

The information storage medium 1006 stores mainly a program, image data for representing objects, sound data and others. The information storage medium for storing the game program and other data in a domestic game machine can be implemented by, for example, a CD-ROM, a game cassette, a DVD or the like. An arcade game machine may use a memory such as ROM. In this case, the information storage medium 1006 is in the form of ROM 1002.

The control device 1022 corresponds to a game controller, control panel or the like. The control device 1022 is used by the player for inputting his or her decision into the game machine as the game progresses.

CPU 1000 performs the control of the entire game machine and processing of data according to the program stored in the information storage medium 1006, the system program (such as initialization information for the main body) stored in the ROM 1002, signals input through the control device 1022 and so on. RAM 1004 is a storage means used as a working area for the CPU 1000 and stores given contents in the information storage medium 1006 and ROM 1002 or the results of computation in the CPU 1000. The structure of data having a logical structure for implementing this embodiment is provided on this RAM or information storage medium.

The sound and image generation IC's 1008, 1010 in this game machine are to output game sounds and images in a preferred manner. The sound generation IC 1008 is in the form of an integrated circuit for generating game sounds such as sound effects or background music, based on the information stored in the information storage medium 1006 and ROM 1002, the generated sounds being then outputted through the speaker 1020. The image generation IC 1010 is an integrated circuit for generating pixel information to be outputted toward the display 1018 based on the image information from the information storage medium 1006, RAM 1004, ROM 1002 and so on. The display 1018 may be in the form of a so-called head mount display (HMD).

The communication device 1024 sends and receives various items of information which are utilized in the game machine from and to the external. The communication device 1024 is connected to the other game machine(s) to send and receive given information corresponding to the game program from and to the other game machines or to send and receive information including a game program and other data through a communication line.

Processing described in connection with FIGS. 1 to 3 can be implemented by the information storage medium 1006 storing the program for performing the steps shown in the flow chart of FIG. 4 and the CPU 1000, image generation IC 1010 and sound generation IC 1008 operated according to that program. The processing by the image generation IC 1010 and sound generation IC 1008 may be performed in a software manner through the CPU 1000 or all-purpose DSP.

When this embodiment is applied to an arcade game machine as shown in FIG. 1, a system board (or circuit board) 1106 included in the game machine comprises CPU, image generation IC, sound generation IC and others all of which are mounted therein. Based on at least one of the operational information from the player and instruction from the computer, a semiconductor memory 1108, which is an information storage medium on the system board 1106, stores information for performing the computation of moving the moving body within the object space, information necessary to receive the additional charge before game termination, information necessary to change the game termination number for player's benefit in comparison with the normal one to be set by reception of a game charge for the normal one-play of the game when the additional charge is received by the game machine, information for terminating the game when any one of the various items reaches the game termination number which has changed for player's benefit, information for generating images visible from a given viewpoint within the object space and other information. The information is called the stored information below. The stored information contains at least one item of information selected from program codes, image information, sound information, information of object shape, table data, list data, player information for performing processing of the present invention, information for instructing the processing of the present invention, and information for performing processing according to the instructions and so on.

Figure 6A:
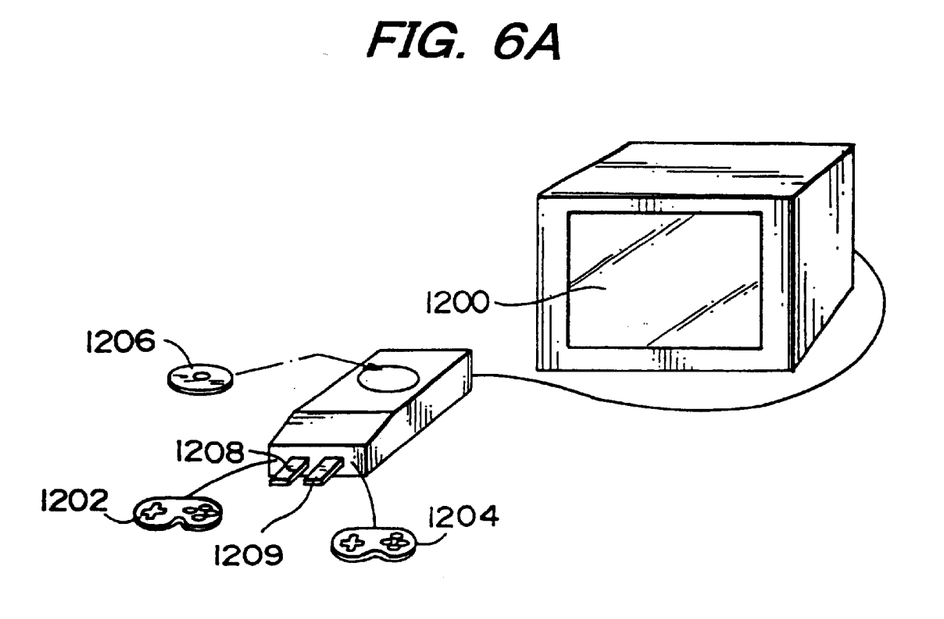
FIGS. 6A and B show various forms of game machine to which this embodiment of the invention can be applied.

FIG. 6A shows a domestic game machine to which this embodiment is applied. A player enjoys a game by manipulating game controllers 1202 and 1204 while viewing a game images on a display 1200. In such a case, the aforementioned stored information is stored in CD-ROM 1206 and memory cards 1208, 1209 which are detachable information storage media to the game machine body.

Figure 6B:
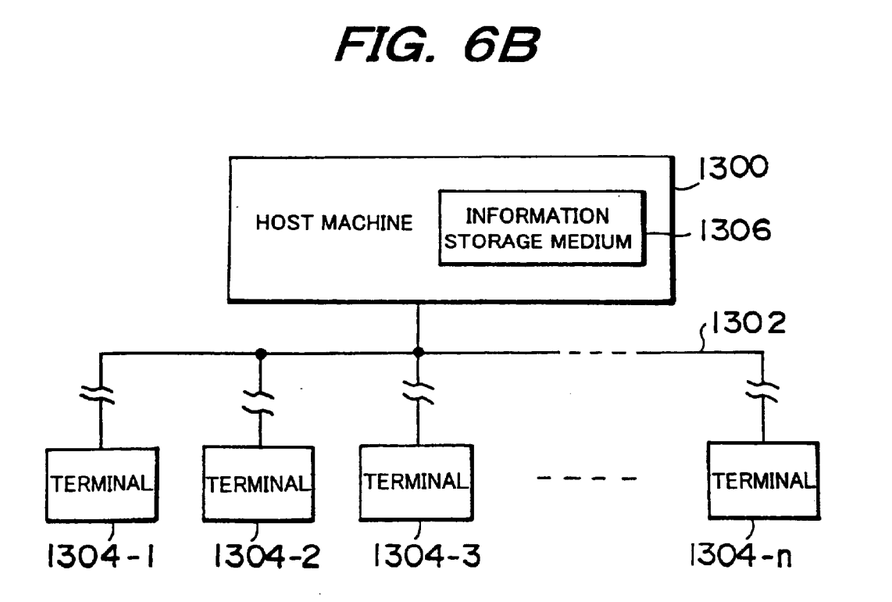

FIG. 6B shows an example wherein this embodiment is applied to a system which includes a host machine 1300 and terminals 1304-n to 1304-n connected to the host machine 1300 through a communication line 1302 (which includes a small-scale network such as LAN or a global network such as internet). In this case, the stored information is stored in a information storage medium 1306 such as magnetic disk, magnetic tape, semiconductor memory and the like which can be controlled by the host machine 1300. When each of the terminals 1304-1 to 1304-n has CPU, image generation IC and sound processing IC and can generate game images and sounds in a stand-alone manner, it receives a game program and so on which are necessary to generate game images and sounds, from the host machine 1300. On the other hand, if the game images and sounds cannot be generated by the terminals in the stand-alone manner, the host machine 1300 will generate the game images and sounds which are in turn transmitted to the terminals 1304-1 to 1304-n.

In the structure of FIG. 6B, the processing according to the present invention may be shared between the host machine and terminals (or among the host machine, terminals and a server, if desired). Furthermore, the stored information for implementing the present invention may shared between the information storage media of the host machine and terminals (or among the information storage media of the hose device, terminals and server) for storage.

As the terminals connected to the communication line, both the domestic and arcade game machines may be used. When the arcade game machine is connected to the communication line, it is desirable that the arcade game machine use a portable information storage device (which may be in the form of memory card, PDA or portable game device) which can transfer information from and to the other similar arcade game machines and also communicate with any domestic game machine.

It is to be understood that the present invention is not limited to the above description, but may be carried out in any of various other forms.

Although this embodiment has been described as to reception of the additional game charge before game initiation, this embodiment may similarly be applied to reception of an additional charge during the game play. In such a case, the game termination number may automatically be changed when the additional charge is added. The game termination number may also be changed by input of decision for changing the game termination number after reception of the additional charge.

Alternatively, the game termination number may be changed in accordance with the amount of inserted game charge when there are a plurality of different game charges.

Although the present invention has been described as to termination of the game when the time limit or specific number of laps reaches the game termination number, the present invention may similarly be applied to termination of the game when at least one of the lap number, life, a play time, player's vehicles, game points and game stages, reaches a given game termination number.

Although the present invention has been described as to reception of the game charge in the form of a coin, the present invention may similarly be applied to reception of the game charge in the form of a bill, card or imitation money.

Although the present invention has been described as to the player's moving body in the form of a motorcycle, the present invention may similarly be applied to any other suitable form such as motorcar, horse, jet-ski or boat.

Although the present invention has been described as to the racing game, the present invention may similarly be applied to any other suitable game such as competition game, sports game, fighting game, roll-playing game or shooting game).

The present invention may similarly be applied not only to the domestic and arcade game machines, but also to any other suitable game device such as simulator, large-scale attraction machine in which a number of players can simultaneously enjoy a game, personal computer, multi-media terminal or system board for generating game images.

What is claimed is:

1. A game machine for a game which is terminated when at least one of given items including a lap number, life, a play time, player's vehicles, game points and game stages, reaches a given game termination number specified for each item, said game machine comprising:

means for receiving a normal one play game charge before receiving an additional game charge;

means for outputting an additional charge reception screen before starting the game;

means for receiving the additional game charge and a decision that is input by a player to change the game termination number for a player's benefit within a given time during which the additional charge reception screen is displayed;

means for changing the game termination number for the player's benefit, in response to reception of the additional game charge and the decision within the given time, in comparison with a normal game termination number to be set by reception of the normal one play game charge for a normal one play of the game; and means for terminating the game when at least one of said items reaches the changed game termination number.

2. A game machine for a game which is terminated when a play time reaches a given time limit, said game machine comprising:

means for receiving a normal one play game charge before receiving an additional game charge;

means for outputting an additional charge reception screen before starting the game;

means for receiving the additional game charge and a decision that is input by a player to change the time limit for a player's benefit within a given time during which the additional charge reception screen is displayed;

means for changing the time limit for the player's benefit, in response to reception of the additional game charge and the decision within the given time, in comparison with a normal time limit to be set by reception of the normal one play game charge for a normal one play of the game; and means for terminating the game when the play time reaches the changed time limit.

3. A game machine for a game which is terminated when a moving body operated by a player has moved a specific number of laps on a game course, said game machine comprising:

means for receiving a normal one play game charge before receiving an additional game charge;

means for outputting an additional charge reception screen before starting the game;

means for receiving the additional game charge within a given time before starting the game;

means for changing the specific number of laps for the player's benefit, in response to reception of the additional game charge within the given time before starting the game, in comparison with a normal specific number of laps to be set by reception of the normal one play game charge for a normal one play of the game; and means for terminating the game when the moving body operated by the player has moved the changed specific number of laps on the game course.

4. A computer-readable information storage medium for playing a game which is terminated when at least one of given items including a lap number, life, time limit, player's vehicles, game points and game stages, reaches a given game termination number specified for each item, said information storage medium comprising information for implementing:

means for receiving a normal one play game charge before receiving an additional game charge;

means for outputting an additional charge reception screen before starting the game;

means for receiving the additional game charge and a decision that is input by a player to change the game termination number for a player's benefit within a given time during which the additional charge reception screen is displayed;

means for changing the game termination number for the player's benefit, in response to reception of the additional game charge and the decision within the given time, in comparison with a normal game termination number to be set by reception of the normal one play game charge for a normal one play of the game; and means for terminating the game when at least one of said items reaches the changed game termination number.

5. A computer-readable information storage medium for playing a game which is terminated when a play time reaches a given time limit, said information storage medium comprising information for implementing:

means for receiving a normal one play game charge before receiving an additional game charge;

means for outputting an additional charge reception screen before starting the game;

means for receiving the additional game charge and a decision that is input by a player to change the time limit for a player's benefit within a given time during which the additional charge reception screen is displayed;

means for changing the time limit for the player's benefit, in response to reception of the additional game charge and the decision within the given time, in comparison with a normal time limit to be set by reception of the normal one play game charge for a normal one play of the game; and means for terminating the game when the play time reaches the changed time limit.

6. A computer-readable information storage medium for playing game which is terminated when a moving body operated by a player has moved a specific number of laps on a game course, said information storage medium comprising information for implementing:

means for receiving a normal one play game charge before receiving an additional game charge;

means for outputting an additional charge reception screen before starting the game;

means for receiving the additional game charge within a given time before starting the game;

means for changing the specific number of laps for a player's benefit, in response to reception of the additional game charge within the given time before starting the game, in comparison with a normal specific number of laps to be set by reception of the normal one play game charge for a normal one play of the game; and means for terminating the game when the moving body operated by the player has moved the changed specific number of laps on the game course.

* * * * *